United States Patent [19]

Heydrich et al.

[11] 4,328,772
[45] May 11, 1982

[54] COMBUSTION CHAMBER FOR AN INTERNAL COMBUSTION ENGINE

[75] Inventors: Hans Heydrich, Phoenix, Ariz.; Melvin E. Woods, Columbus, Ind.; William C. Geary, Ballston Lake, N.Y.

[73] Assignee: Cummins Engine Company, Inc., Columbus, Ind.

[21] Appl. No.: 111,772

[22] Filed: Jan. 14, 1980

[51] Int. Cl.³ .......................... F02F 1/18; F02F 1/24
[52] U.S. Cl. .............................. 123/193 CH; 123/669
[58] Field of Search ........ 123/193 R, 193 H, 193 CH, 123/193 C, 657, 668, 669; 277/235 B

[56] References Cited

U.S. PATENT DOCUMENTS

| | | | |
|---|---|---|---|
| 2,330,106 | 9/1943 | Bernstein et al. | 277/235 B |
| 3,115,127 | 12/1963 | Spencer et al. | 123/669 |
| 3,125,082 | 3/1964 | Stansfield et al. | 123/193 CH |
| 3,552,370 | 1/1971 | Briggs | 123/669 |
| 3,987,776 | 10/1976 | Goto et al. | 123/193 CH |
| 4,103,913 | 8/1978 | McDowell | 277/235 B |
| 4,112,907 | 9/1978 | Nikly | 123/193 CH |

FOREIGN PATENT DOCUMENTS

| | | | |
|---|---|---|---|
| 1032977 | 6/1958 | Fed. Rep. of Germany | 123/193 R |
| 2723576 | 11/1978 | Fed. Rep. of Germany | 123/235 B |
| 473472 | 10/1937 | United Kingdom | 123/669 |

*Primary Examiner*—Craig R. Feinberg
*Attorney, Agent, or Firm*—Neuman, Williams, Anderson & Olson

[57] ABSTRACT

A combustion chamber for an internal combustion engine is provided having a cylindrical member, an end piece overlying one end of the member, and a piston mounted for reciprocatory movement within the member and when at a predetermined relative position, coacting with the end piece and member to form a combustion cavity. A compliant gas seal is positioned between the end piece and member and is in surface contact therewith. The seal encompasses the combustion cavity and has a portion thereof continuously exposed to the cavity.

8 Claims, 4 Drawing Figures

COMBUSTION CHAMBER FOR AN INTERNAL COMBUSTION ENGINE

BACKGROUND OF THE INVENTION

During normal operation of various types of internal combustion engines, the surfaces of certain of the components thereof defining the combustion cavities attain temperatures within the range of 1500°–1800° F. which approach adiabatic wall conditions. Such temperatures prohibit the use of conventional sealing methods and cause metals to become inherently weak. Where ceramics are utilized as thermal barriers, they are oftentimes brittle and when subjected to concentrated sealing pressures are prone to fracture and, thus, deleteriously affect their thermal insulative qualities.

SUMMARY OF THE INVENTION

Thus, it is an object of the invention to provide a combustion chamber which overcomes the aforenoted problems when, during normal operation of the engine, temperatures within the combustion cavities are very high (e.g., 1500°–1800° F.).

It is a further object of the invention to provide an improved combustion chamber for an internal combustion engine which will effectively seal against high transient pressures developed during operation of the engine while at the same time reducing the clamping loads required to be exerted on the various components to maintain same in proper assembled relation.

It is a still further object of the invention to provide an improved insulated combustion chamber for an internal combustion engine which enables reduced cylinder head clamping loads to be employed, thereby enabling greater movement to occur between various components during thermal expansion thereof and effect reduction in the magnitude of the internal stresses and strains developed within the engine.

It is a still further object of the invention to provide an improved insulated combustion chamber for an internal combustion engine wherein the reduced cylinder head clamping load is more evenly distributed over various components and thereby reduces wear on such components.

Further and additional objects will appear from the description, accompanying drawings and appended claims.

In accordance with one embodiment of the invention, an internal combustion engine is provided having a cylindrical member, an end piece overlying one end of the member, and a piston mounted for reciprocatory movement within the member. When the piston is at one relative position within the member, the end piece, the piston and the cylinder member coact to form a combustion cavity. An annular gas seal is provided which is interposed the end piece and cylinder member. The seal encompasses the cavity and has a portion thereof exposed to the cavity.

DESCRIPTION

For a more complete understanding of the invention, reference should be made to the drawings, wherein.

Figure 1:
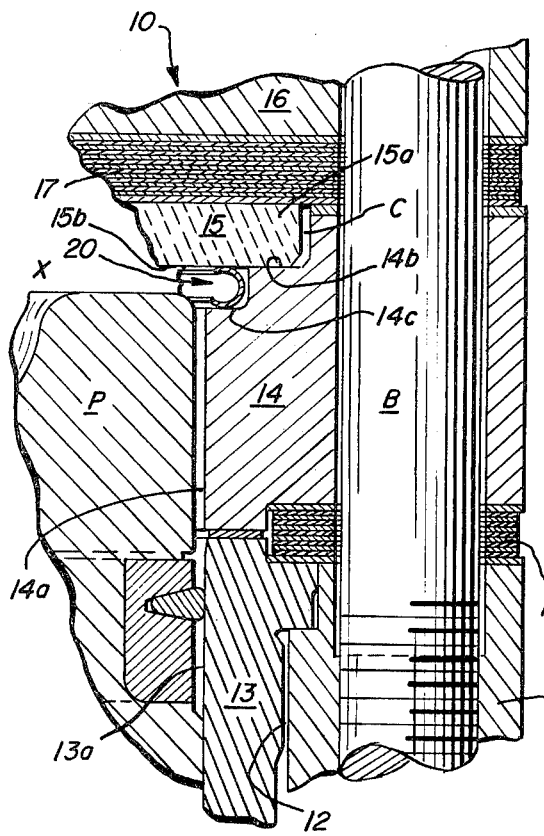
FIG. 1 is an enlarged fragmentary vertical sectional view of one form of the improved combustion chamber for an internal combustion engine.

Referring now to the drawings and more particularly to FIG. 1, an internal combustion piston-type engine 10 is shown which includes a metal block 11 having a plurality of cylinders 12 formed therein, only one being shown, in which is normally positioned a metallic cylinder liner 13. Disposed in axially aligned superposed relation with respect to the block cylinder and the liner is a cylindrically shaped deck spacer 14. The spacer is provided with a cylindrically shaped interior wall 14a which is coincidental with the cylinder surface 13a formed by the liner 13.

Overlying the upper end of wall 14a is an end piece 15 oftentimes referred to as a hot plate. The marginal portion 15a of piece 15 is disposed within and supported by a suitable shoulder 14b formed in the upper end of spacer 14. Concentrically disposed with respect to shoulder 14b and disposed radially inwardly therefrom is an annular ledge 14c which is also formed in the upper end of the spacer 14. The spacer may be formed of a thermal insulative ceramic material or a suitable metal having the cylindrical surface 14a thereof coated with a suitable thermal insulative material.

The end piece 15 may be formed of a suitable metallic or high strength ceramic material which will maintain its strength and integrity at the aforenoted high temperatures (e.g. 1500°–1800° F.) in which case the end piece 15 is thermally insulated from a cylinder head 16 by a suitable thermal barrier 17. The head 16, spacer 14, liner 13 and block 11 are clamped together by a plurality of anchor bolts B which are threaded into the block.

As will be noted in FIG. 1, the radial dimension of the shoulder 14b formed in the upper end of the spacer 14 is such that a small clearance C is provided between the outer periphery of the end piece and the outer limits of the shoulder. Such clearance permits thermal expansion of the end piece 15 without causing serious stresses and strains to develop between the end piece and spacer during operation of the engine.

Instead of the end piece 15 being of a metallic material, it may be formed of a thermal insulative material such as a ceramic known as Zirconia, or a glass ceramic (e.g. lithium, alumina silicate—LAS; molybdenum, alumina silicate—MAS; or alumina silicate—AS). Where the end piece is of such a material, it may be separated from the head by a relatively thin compliant seal 117, see FIG. 2 (e.g. compressed graphite).

Mounted for reciprocatory movement within the cylinder defined by the liner surface 13a and spacer surface 14a is a piston P. When the piston is at, or near top-dead center, it coacts with the end piece 15 and spacer 14 to form a combustion cavity X. It is within cavity X that the aforenoted high temperatures and pressures are developed during normal operation of the engine.

Figure 3:
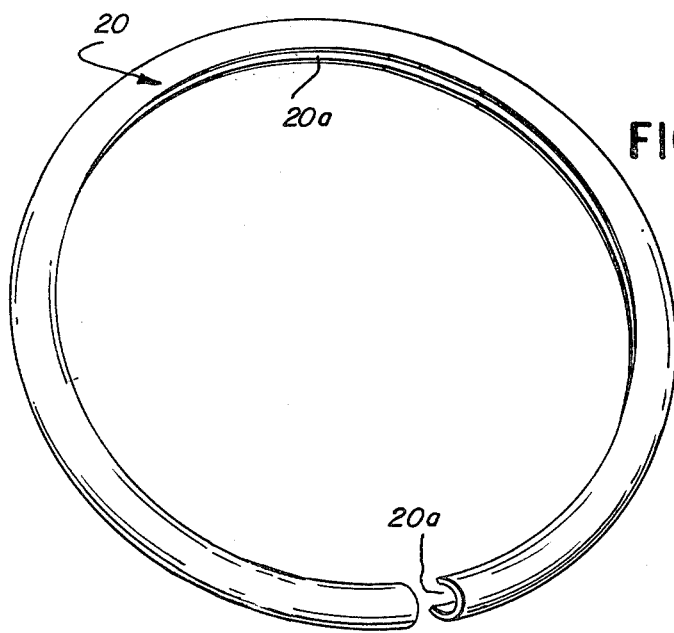
FIG. 3 is an enlarged perspective view of one form of the compliant gas seal embodied in the construction, shown in FIG. 1, and with a portion thereof broken away.

To retain the high pressures within cavity X and, thus, improve efficiency of the engine, a compliant metallic gas seal 20 is provided, see FIGS. 1 and 3. The seal is of a high temperature resistant, spring metal and is of a continuous annular configuration and is sized to fit within the ledge 14c formed in spacer 14. The upper portion of seal 20 resiliently engages the undersurface 15b of the end piece 15 and the lower portion of the seal resiliently engages the radially disposed surface of the ledge 14c. As seen in FIG. 1, seal 20 has a C-shape cross-sectional configuration with the open side 20a of the C exposed to the combustion cavity X. Thus, during operation of the engine the high pressure combustion gases will enter the interior of seal 20 through the open side 20a and exert an outward pressure on the seal causing the latter, in turn, to exert a more positive sealing force against the adjacent surfaces of the end piece and ledge.

If desired, a suitable dry lubricant (e.g. graphite) may be interposed the seal 20 and the adjacent surfaces in contact therewith so as to reduce friction wear.

By reason of the expansion of seal 20 in response to the high gas pressures developed within cavity X, the clamping load exerted on the end piece and spacer by tightening of the anchor bolts can be reduced, thereby avoiding fracturing of the brittle ceramic insulative material utilized for certain components. Furthermore, the reduced clamping loads minimize the friction wear which normally occurs between the end piece and spacer due to thermal expansion of the end piece.

Figure 2:
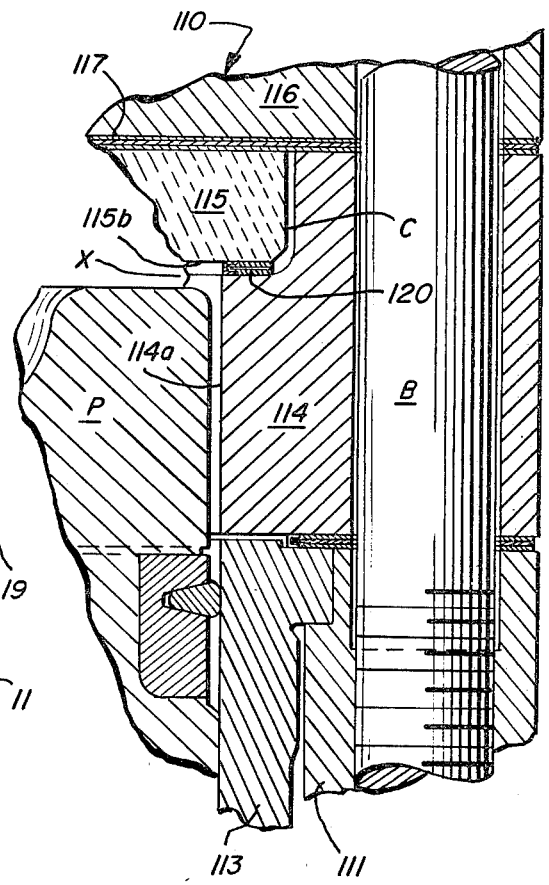
FIG. 2 is similar to FIG. 1 but of a second form of the improved combustion chamber.

In the modified combustion chamber construction 110 shown in FIG. 2, the seal 20 has been replaced by a compliant seal 120. The components of the combustion chamber 110 corresponding to those of chamber 10 will be identified by a like number except in a one hundred series.

Figure 4:
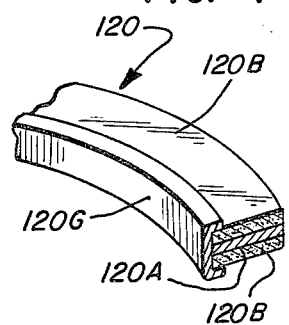
FIG. 4 is a fragmentary perspective sectional view of a segment of a second form of compliant seal.

Compliant seal 120, as seen more clearly in FIG. 4, may be of a laminated construction which includes a thin metallic center lamina 120A (e.g. about 0.010 inch thick) sandwiched between upper and lower laminas 120B (e.g. each being about 0.022 inch thick) which are formed of a compressed graphite or the like. The overall thickness of the seal before compression may be about 0.054 inch and under compression about 0.032 inch. As a protection against the cylinder becoming contaminated by particles of graphite from seal 120, a thin metallic grommet 120G (e.g. about 0.002–0.005 inch thick) may be secured to the portions of the laminas 120B which are disposed adjacent to the combustion cavity X. In addition, the grommet protects the graphite laminas from oxidation. Seal 120 is of annular broad band configuration and may have a radial dimension of about 0.825 inch, thereby effecting wider more uniform distribution of the clamping load between the end piece and the spacer.

In the combustion chamber 110, the hot plate 115 utilized therein may be formed of a thermal insulative ceramic material in which a second compliant seal 117, similar to seal 120, would be disposed between the cylinder head 116 and the hot plate 115.

In both chambers 10, 110 the undersurface of the deck spacer 14, 114 is preferably separated from the block and cylinder liner by a suitable thermal insulative seal 19, 119. Seal 19 may be formed of a plurality of thin shims of the type described in application Serial No. filed Thus, it will be seen that an improved combustion chamber has been provided which is capable of withstanding high temperatures and pressures generated within the combustion cavity during normal operation of an internal combustion piston-type engine embodying such a chamber without the need for inordinately high clamping loads being imposed upon the various components embodied in the combustion chamber. Furthermore, the utilization of reduced clamping loads, significantly decreases friction wear, as well as avoid distortion of the various components.

We claim:

1. A combustion chamber for an internal combustion engine, comprising a cylindrical member including a cylindrical liner section and a separate cylindrical spacer section containing an inner concentric recess, the latter being of thermal insulative material and disposed in endwise coaxial relation spaced above said liner section and effecting separation of the liner section from an end piece; said end piece positioned substantially within and substantially closing off one end of the cylindrical spacer section of said member; a piston mounted for reciprocatory movement within said member, said piston when at a predetermined relative position coacting with said member and end piece to form a combustion cavity; a compliant gas seal interposed the one end of said cylindrical spacer section and said end piece and in surface contact therewith and having a portion of said seal exposed to said combustion cavity; and means for retaining said end piece and cylinder member in assembled relation.

2. The combustion chamber of claim 1 wherein the cavity-forming surface of the end piece is of thermal insulative material.

3. The combustion chamber of claim 1 wherein the compliant gas seal is an expansible substantially annular member encompassing said combustion cavity and interposed said spacer section and said end piece, the center of curvature of said seal being coaxial with the axis of said cylinder member, said seal being responsive to a predetermined combustion gas pressure within said combustion cavity to effect increased sealing contact between said seal and the surfaces of said end piece and cylindrical member.

4. The combustion chamber of claim 3 wherein the expansible gas seal is provided with a hollow interior in continuous communication with the combustion cavity.

5. The combustion chamber of claim 4 wherein the gas seal has a substantially C-shape cross-sectional configuration with the open side thereof facing the combustion cavity.

6. The combustion chamber of claim 1 wherein the surface portion of the cylindrical spacer section adjacent the end piece and forming a part of the combustion cavity is provided with an annular ledge in which the compliant gas seal is positioned.

7. The combustion chamber of claim 6 wherein the compliant gas seal is of laminated construction and has a substantially broad ring-like configuration and includes a metallic substantially flat center core sandwiched between substantially flat laminas of thermal insulative material; the core and laminas being disposed in coincident relation and encompassing the combustion cavity.

8. The combustion chamber of claim 7 wherein the compliant gas seal includes a thin wall grommet which encircles the portion of the gas seal adjacent said combustion cavity, said grommet having segments thereof overlying corresponding exterior segments of said laminas.

* * * * *

UNITED STATES PATENT AND TRADEMARK OFFICE
CERTIFICATE OF CORRECTION

PATENT NO. : 4,328,772
DATED : May 11, 1982
INVENTOR(S) : Hans Heydrich, Melvin E. Woods, William C. Geary It is certified that error appears in the above-identified patent and that said Letters Patent are hereby corrected as shown below:

Column 4, Line 13 - after "within" insert -- said recess --

Signed and Sealed this

Seventh Day of September 1982

[SEAL]

Attest:

Attesting Officer

GERALD J. MOSSINGHOFF

Commissioner of Patents and Trademarks